(12) United States Patent
Weizman

(10) Patent No.: US 8,935,473 B2
(45) Date of Patent: Jan. 13, 2015

(54) SYSTEM AND METHOD FOR A PORTABLE MEMORY DEVICE TO ACCESS AND ACQUIRE ADDITIONAL MEMORY FROM A REMOTE LOCATION

(75) Inventor: Jonathan Weizman, Paris (FR)

(73) Assignee: New Dane (FR)

( * ) Notice: Subject to any disclaimer, the term of this patent is extended or adjusted under 35 U.S.C. 154(b) by 1108 days.

(21) Appl. No.: 11/650,286

(22) Filed: Jan. 5, 2007

(65) Prior Publication Data

US 2008/0168152 A1    Jul. 10, 2008

(51) Int. Cl.
*G06F 12/02* (2006.01)
*H04L 29/08* (2006.01)
*G06F 17/30* (2006.01)

(52) U.S. Cl.
CPC ...... *H04L 67/1097* (2013.01); *G06F 17/30126* (2013.01)
USPC ............ 711/115; 709/213; 709/216; 709/217

(58) Field of Classification Search
USPC ............................ 711/115; 709/213, 216–217
See application file for complete search history.

(56) References Cited

U.S. PATENT DOCUMENTS

| 6,269,382 | B1 | 7/2001 | Cabrera et al. | |
|---|---|---|---|---|
| 2002/0099784 | A1* | 7/2002 | Tran | 709/212 |
| 2003/0028614 | A1* | 2/2003 | Jeon | 709/217 |
| 2004/0093607 | A1* | 5/2004 | Elliott | 719/326 |
| 2004/0203625 | A1 | 10/2004 | Kim | |
| 2004/0221118 | A1* | 11/2004 | Slater et al. | 711/163 |
| 2005/0136949 | A1* | 6/2005 | Barnes, Jr. | 455/461 |
| 2006/0039356 | A1 | 2/2006 | Rao | |
| 2006/0182100 | A1 | 8/2006 | Ki | |
| 2006/0288040 | A1 | 12/2006 | Boerger et al. | |
| 2007/0097885 | A1 | 5/2007 | Traversat | |
| 2007/0162579 | A1* | 7/2007 | Lawrence et al. | 709/223 |
| 2007/0165629 | A1 | 7/2007 | Chaturvedi | |
| 2008/0005290 | A1 | 1/2008 | Nykanen | |
| 2008/0091554 | A1* | 4/2008 | Huang et al. | 705/26 |
| 2009/0175165 | A1 | 7/2009 | Leighton | |
| 2010/0040057 | A1 | 2/2010 | Ko | |

* cited by examiner

*Primary Examiner* — Jasmine Song

(74) *Attorney, Agent, or Firm* — Jafari Law Group, Inc.; David V. Jafari; Saul Acherman

(57) ABSTRACT

The present invention is a system and method for a portable memory device to access and acquire additional memory from a remote location by utilizing a network connection to access remote memory. A portable memory device comprising of software that can determine the location of data to be stored based on a criteria that governs whether data may be stored locally or remotely, may utilize a network, connected to one or several remote locations with available memory storage space, to access available memory and store data remotely.

44 Claims, 8 Drawing Sheets

| Name | Size | Date Modified | Date Created | Date Accessed | Type |
|---|---|---|---|---|---|
| 1.1 | 2 KB | 09/06/2006 10:29 | 01/26/2007 2:57 PM | 03/08/2006 | Microsoft Word |
| 2.0 | 2 KB | 09/06/2006 10:33 | 01/02/2007 2:32 PM | 03/08/2006 | File Folder |
| AccessEnum | 1 KB | 07/08/2006 20:56 | 01/29/2007 11:56 AM | 03/08/2006 | File Folder |
| antispyware | 2 KB | 26/09/2006 10:53 | 02/01/2007 9:32 AM | 03/08/2006 | Microsoft Excel |
| CommandStripper | 1 KB | 29/05/2006 12:14 | 01/24/2007 2:43 PM | 03/08/2006 | Microsoft Word |
| Deprotecor | 52 KB | 25/07/2006 16:05 | 01/30/2007 2:23 PM | 01/30/2006 | Microsoft Word |
| DiskMon | 20 KB | 07/08/2006 20:56 | 01/30/2007 1:27 PM | 03/05/2006 | File Folder |
| handle | 118 KB | 29/05/2006 12:14 | 01/30/2007 10:01 AM | 02/26/2006 | ASPX File |
| ilmerge | 53 KB | 31/07/2006 12:07 | 01/30/2007 1:18 PM | 01/30/2006 | Microsoft Excel |
| ndepends | 359 KB | 08/08/2006 09:50 | 11/08/2006 3:27 PM | 03/05/2006 | CS File |
| ParentControl | 42 KB | 29/05/2006 12:14 | 01/30/2007 8:49 AM | 02/16/2006 | RESX File |
| pinvoke | 1 KB | 28/07/2006 10:19 | 01/30/2007 7:43 AM | 03/08/2006 | Adobe Acrobat |
| pinvoke2 | 499 KB | 07/08/2006 20:56 | 01/17/2007 2:18 PM | 03/05/2006 | Adobe Acrobat |
| Reflector | 11 KB | 24/07/2006 17:51 | 05/16/2006 11:39 AM | 02/23/2006 | Microsoft Excel |
| regmon | 1 KB | 29/05/2006 12:14 | 05/16/2006 10:48 AM | 03/08/2006 | File Folder |
| tcpview | 36 KB | 07/08/2006 20:56 | 01/31/2007 8:33 AM | 02/21/2006 | File Folder |
| VirtualCD | 304 KB | 07/08/2006 20:56 | 05/16/2006 10:34 AM | 02/16/2006 | File Folder |
| VirtualCD5 | 847 KB | 29/05/2006 12:14 | 05/16/2006 10:35 AM | 02/16/2006 | File Folder |
| autoruns.chm | 33 KB | 28/11/2005 11:54 | 01/22/2007 3:54 PM | 02/20/2005 | Microsoft Word |
| autoruns.exe | 16 KB | 09/12/2005 21:10 | 05/23/2006 4:54 PM | 01/22/2005 | File Folder |
| AutoRuns.txt | 106 KB | 26/09/2006 13:38 | 01/24/2007 9:37 AM | 02/15/2006 | File Folder |
| Autoruns.zip | 53 KB | 27/01/2006 10:03 | 12/19/2006 5:45 PM | 01/25/2006 | File Folder |
| autorunsc.exe | 190 KB | 07/12/2005 14:37 | 01/19/2007 3:44 PM | 02/21/2005 | ASPX File |
| depends.cnt | 33 KB | 16/04/2002 02:10 | 01/03/2007 4:06 PM | 01/30/2002 | File Folder |
| depends.dll | 15 KB | 16/04/2002 02:10 | 12/04/2006 5:36 PM | 02/01/2002 | CS File |

FIG. 4

SYSTEM AND METHOD FOR A PORTABLE MEMORY DEVICE TO ACCESS AND ACQUIRE ADDITIONAL MEMORY FROM A REMOTE LOCATION

TECHNICAL FIELD OF THE INVENTION

This invention relates generally to a system and method for a portable memory device to access and acquire additional memory from a remote location and unify them; more particularly, a portable memory device that can store data in excess of its own physical memory capacity by remotely accessing memory via any network connection.

BACKGROUND OF THE INVENTION

Traditionally, memory storage devices, such as Universal Serial Bus (USB) memory drives, have been used to store information in a practical manner. Practical aspects of these devices include their transportability, due to their relatively small compact sizes, additional security, and of course, they offer an additional source of external memory. Throughout recent years, technological advances have launched variations of these devices that are faster, smaller, and capable of storing more information.

Although practical, these devices present a drastic limitation in their use primarily due to their small physical size. All of these devices carry a limited amount of memory which requires continuous emptying out of stored information in order to continue use of the physical memory. Users of such devices must transfer or erase the information stored once the device has reached its own memory capacity. Alternatively, a user must purchase replacements or find other devices for storing their information.

Part of the problem is the growing trend for constant accumulation of information in today's societies around the globe. Whether personal or commercial in nature, every individual at one point or another requires a system to store documents, pictures, photographs, media, or any other type of data that may or may not be used at a later time.

Despite technologies that have made possible devices capable of storing entire encyclopedias in a single unit, contemporary devices eventually run out of memory due primarily to their physical memory limitations.

It is desirable to have a system and method for acquiring and accessing additional memory at times when a device reaches a full memory capacity.

There is a need in the art for a device that can access local and remote memory so that virtually an unlimited memory storage space can be made available to a user. It is to these ends that the present invention has been developed.

SUMMARY OF THE INVENTION

To minimize the limitations found in the prior art, and to minimize other limitations that will be apparent upon the reading of the specification, the present invention provides a system and method for a portable memory device to access and acquire additional memory from a remote location.

The present invention comprises a portable memory device that can connect to a network, for example the internet, to access available memory storage space for storing information. A portable memory device in accordance with the present invention may also store information on its own physical memory space. Additionally, upon determining certain criteria, for example available physical memory, data content, or user input, the portable memory device may also seek available memory storage space from one or more remote locations.

A system in accordance with the present invention comprises at least one server, a network, for example the internet, an input interface, a processor, a network interface, a display, and a portable memory device, wherein the portable memory device further comprises a user interface for displaying stored information and a software for accessing available memory storage space via the network.

One method in accordance with practice of the present invention comprises receiving a request to store data on to a portable memory device, determining a criteria, for example file size and memory capacity, that governs where the data is to be stored, and either storing the data on to the portable memory device or storing the data in a remote location, for example an internet based or web-based storage location, or on a private server.

Another method in accordance with practice of the present invention comprises receiving a request to store a first set of data on to a portable memory device, determining whether the first set of data may be stored in the portable memory device based on a criteria, transferring a second set of data from the portable memory device on to a remote location, for example a web-based storage location, and storing the first set of data on to the portable memory device.

Yet another method in accordance with practice of the present invention comprises determining if a data is located on the portable memory device or on a remote location, for example a web-based memory storage space, and accessing the data from its location using a pointer.

Yet another method in accordance with the present invention comprises detecting a portable memory device, reading a software in the portable memory device, executing the software with zero installation, launching a user interface capable of displaying a pointer that leads to a set of data stored in the portable memory device, receiving a request from a user to retrieve the set of data displayed on the user interface, accessing the set of data, and retrieving the set of data.

Finally, an apparatus in accordance with the present invention comprises a portable memory device, a user interface, and a software in the portable memory device capable of accessing available memory storage space via a network connection, wherein the memory storage space is located in a remote location, for example a web-based memory storage.

It is an object of the present invention to provide a device with unlimited access to memory storage space for storing information.

It is another object of the present invention is to offer unlimited memory capacity by remotely seeking for more memory space in a physically different location.

It is still another object of the invention to address the need of an enterprise to centralize mobile data.

It is still another object of the present invention to use extended memory as a common place to share data.

It is still another object of the present invention to offer transparent file sharing between physical devices using an access control policy for protection.

It is still another object of the present invention to use a remote memory space not only for remote storage but also as a place to place data that will be processed later by an external program having access to the remote location.

It is still another object of the present invention to use a remote memory space for special purposes such as sending to files for printing, and placing data in databases.

It is still another object of the present invention to display the information saved in a manner that does not disclose the physical location where the information is stored.

It is still another object of the present invention to provide users with a choice of allowing others to access their stored information by accessing a network, for example the internet, or by directly storing information on another's portable memory device.

It is still another object of the present invention to circumvent the need to input user identification when accessing web-based storage space.

It is still another object of the present invention to provide users with public and private memory storage space both on physical and remote memory locations.

These and other advantages and features of the present invention are described with specificity so as to make the present invention understandable to one of ordinary skill in the art

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 4 illustrates a screenshot of a user interface for a portable memory device in accordance with the present invention, displaying both local and remote files as if they were on the same physical location.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the invention.

Figure 1:
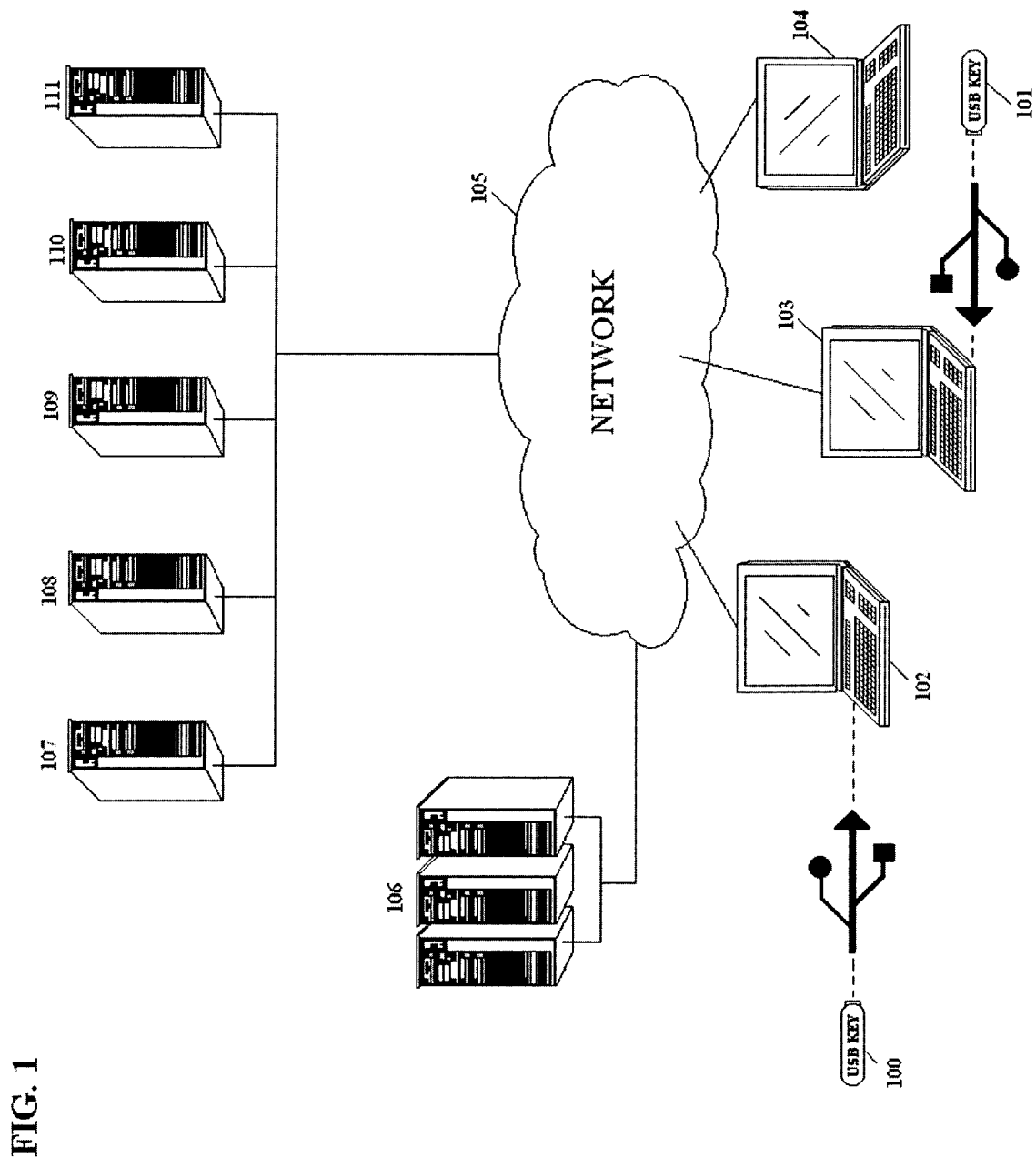
FIG. 1 illustrates a basic physical connection of a system for acquiring memory from a remote location in accordance with one embodiment of the present invention.

Turning now to FIG. 1, a basic physical connection of a system for acquiring memory from a remote location in accordance with one embodiment of the present invention is illustrated.

The portable unlimited memory system shown comprises of portable memory devices 100 and 101, computers 102, 103 and 104 linked to a network 105, central server 106, and remote servers 107, 108, 109, 110 and 111.

Typically, portable memory device 100 and portable memory device 101 are small, lightweight, removable and rewritable memory drives equipped with software comprising a graphical user interface (GUI) for manipulation of stored data, for example transferring locally stored files to a remote storage location accessible to portable device 100 or portable device 101 or both (see below).

In an exemplary embodiment, each device comprises a Universal Serial Bus (USB) flash memory device.

Flash memory, a form of non-volatile computer memory known in the art, may allow portable memory devices 100 and 101 to be electrically erased and reprogrammed if needed. This may be desirable for example, if portable memory device 100's software needs to be upgraded or replaced. Flash memory costs far less than other types of memory such as EEPROM and therefore has become the dominant technology wherever a significant amount of non-volatile, solid-state storage is needed. However, other types of memory devices known in the art may be used without departing from the scope of the present invention.

Portable memory devices 100 and 101 may be used for general storage and transfer of data between computers 102, 103, and 104. In one embodiment portable memory devices 100 and 101 may be portable media players, however, portable memory devices 100 and 101 may also be mobile phones, digital cameras, Personal Digital Assistant (PDA) devices, mp3 players, MMC or SD cards, or any other data storage devices capable of permanent (non-volatile) memory storage.

Computer 102, computer 103, and computer 104 may be any type of computers capable of connecting to network 105. A connection with network 105 may be wireless, through a LAN connection, a dial-up connection, or any other method of connecting with network 105 without departing from the scope of the present invention.

Typically network 105 is a large network such as the World Wide Web, but network 105 may be any other type of network without departing from the scope of the present invention, for example a network composed of several computers within an office building.

Via network 105, portable memory devices 100 and 101 may access central server 106 which contains a database (not shown) of memory storage spaces available and distributed throughout servers 107, 108, 109, 110, and 111.

Portable memory devices 100 and 101 may be plugged in to computers 102 and 103 using each computer's USB interface. A user interface may then be initiated to display the files stored by portable memory devices 100 and 101. The files displayed by portable memory device 101 may be located in portable memory devices 100's and 101's physical memory, or the files may be located in a remote location such as servers 107, 108, 109, 110, and 111.

Portable memory device 101 and portable memory device 100 may be utilized very much like any other standard memory device when saving or accessing files in their physical memory. However, portable memory devices 100 and 101 may access central server 106 in the event some specified criteria is met.

In one embodiment, a criteria may be that portable memory device 101's physical memory is full. In another embodiment, the criteria may be data priority, wherein very important or priority data requiring backup is automatically stored on a server as a backup. Central server 106 may accesses known memory storage spaces available throughout network 105, such as memory storage space available in remote servers 107, 108, 109, 110, and 111. These servers may be accessed together or one at a time depending on the available locations for storage and depending on the need by individual users.

For example, and without limiting the scope of the present invention, a user plugs in portable memory device 101 to computer 102 desiring to save some file (not shown). If portable memory device 101 does not have any physical memory left, portable memory device 101 will execute a program in its software to access central server 106 via network 105 and request additional memory to save the file. Central server 106 responds to the request for more memory from portable memory device 101 and searches for known memory banks (i.e. available memory storage space throughout network 105 accessible to central server 106 such as remote servers 107, 108, 109, 110, and 111) to connect portable memory device 101 with server 108 where the file may be stored.

Typically, portable memory device 101 will store files in several remote locations depending on the connectivity capacities of the several servers 107, 108, 109, 110, and 111. For example, if server 107 is too busy and the connection to server 110 is too slow, portable memory device 101 may seek memory storage space from the remaining servers 108, 109, and 111.

In one embodiment portable memory devices 100 and 101 always connect to one particular server. In another embodiment, portable memory devices 100 and 101 will connect to the server with the fastest connecting speed. In yet another embodiment, portable memory devices 100 and 101 will always connect to the server with most available memory storage space without departing from the scope of the present invention.

Typically, portable memory devices 100 and 101 may store data to a private memory storage space designated per portable memory device. For example, portable memory device 100 may be used to store memory accessible only by portable memory device 100 and portable memory device 101, may be used to store memory accessible only by portable memory device 101. Although both devices may have saved information in a common server (e.g. server 110), only portable memory device 100 may access the information portable memory device 100 saved on server 110, and only portable memory device 101 may access the information portable memory device 101 saved in server 110. This may me accomplished by furnishing every portable memory device, such as portable memory devices 100 and 101, with unique identifiers and keys that allow each central server 106 to verify and authorize access to the various servers 107, 108, 109, 110 and 111, every time portable memory device 100 or portable memory device 101 connect to central server 106.

For example, each memory storage space (not shown) is marked with each devices' unique identifier to retrieve the correct data with the corresponding portable memory device unit. Therefore, the files stored using portable memory device 100 may only be accessible to portable memory device 100 even though portable memory device 101 has stored files in the same server (e.g. server 110) because portable memory device 100 has a unique identifier associated with every request made to access memory, retrieve data, or communicate with a remote location to store data.

In another embodiment, all information stored by portable memory device 100 may be accessible by portable memory device 101. Each portable device may have access to the same data which is saved in the various remote servers 107, 108, 109, 110 and 111.

In an exemplary embodiment, each portable device 100 and 101 may store data that is categorized by users as either public data or private data. Public or private data may be stored in the several remote servers 107, 108, 109, 110 and 111. However, portable memory device 100 may access public data stored by portable memory device 101 and may not have access to private data stored by portable memory device 101. Again, this may be accomplished by tagging each file stored by portable memory device 101 as either "public" or "private" and allowing access to files tagged as private files only to a user utilizing a corresponding unique identifier which is embedded in portable memory device 101. Naturally, files tagged as public files may be accessed by any other device with access to the same location where those public files are stored, for example, portable memory device 100. It may be desirable to have "private" files stored on a remote location in case a user's portable memory device is lost or stolen, in particular if such memory device is offered with a service to lock all access to the lost or stolen information. The data that is locked is the data associated with a unique identifier associated with the lost portable memory device—very much similar to services offered for lost or stolen credit cards or mobile phones.

Alternatively, in another embodiment, all information stored by portable memory device 100 is only accessible by portable memory device 100, and no other device may access the information whether stored in a common server or a different server.

Figure 2:
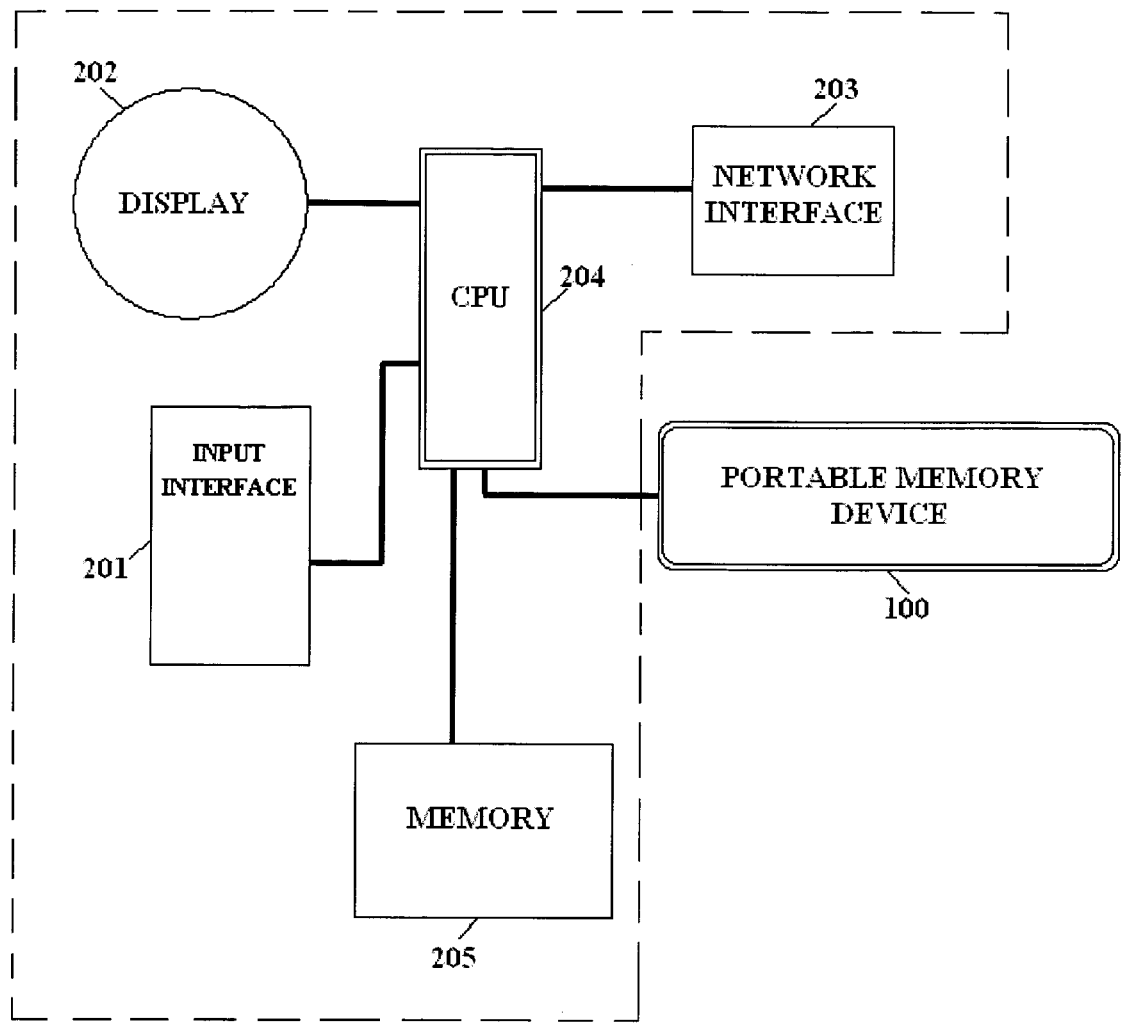
FIG. 2 illustrates a block diagram of a remote memory storage system, which includes portable memory device 100, in accordance with an exemplary embodiment of the present invention.

Turning now to FIG. 2, a block diagram of a remote memory storage system, which includes portable memory device 100, is illustrated in accordance with an exemplary embodiment of the present invention.

A system for providing access to remote memory storage space is shown comprising of portable memory device 100, input interface 201, display 202, network interface 203, and CPU 204, and memory 205.

As discussed above, portable memory device 100 may be a USB key, a portable media player, a cell phone, a camera, a PDA device, an mp3 player, or any other device capable of storing memory.

Input interface 201 may further comprise of a keyboard and mouse on a computer, the keyboard on a cell phone, the control interface of a PDA device, the buttons on an mp3 player, the function keys on a camera, or any other input device that may be utilized to access and command portable memory device 100's software.

Display 202 may be any display on any computer or device which can be used to accesses portable memory device 100's user interface. Display 202 may be an LCD screen, a monitor, or any type of device that may be utilized to display information such as files stored by portable memory device 100.

Network interface 203 can be any type of connection that allows portable memory device 100 to access a network. For example, and without limiting the scope of the present invention, network interface 203 may be a modem on a computer to which portable memory device 100 may be connected. Once connected to the computer, portable memory device 100's software can initiate the modem to establish the required network connection. Alternatively, network interface 203 may be an internal wi-fi circuitry installed in portable memory device 100 for accessing wireless connections that may be available to access a network, for example the internet, where portable memory device 100 may locate available remote memory storage space.

Typically, CPU 204 is located in an external location in relation to portable memory device 100. In one embodiment, portable memory device 100 does not comprise an internal CPU for processing and executing portable memory device 100's software. Rather, portable memory device 100 must be plugged in to another device such as a computer to make use of a CPU and execute its own software. In another embodiment, CPU 204 is located in portable memory device 100. For example in an embodiment in which portable memory device 100 also comprises a camera with a memory and a processor. As mentioned above, an embedded CPU could also be responsible for transparently doing the transfer even without user interface.

In an exemplary embodiment, portable memory device 100 is a USB key that does not contain input interface 201, display 202, network interface 203, or CPU 204. Portable memory device 100 may be plugged in to an external device, for example a computer which comprises of input interface 201, display 202, network interface 203, CPU 204, and memory 205. This connection may be accomplished in a number of ways, for example, and without limiting the scope of the present invention, portable memory device 100 may comprise a USB interface compatible with a common USB interface situated in said computer. Once portable memory device 100 is connected to CPU 204, portable memory device 100's software may be accessed and executed by CPU 204.

Memory 205 may be used by CPU 204 for purposes of running software stored in portable memory device 100 in case portable memory device 100 is not embedded with the other components shown here. Thus, in an embodiment in which portable memory device 100 comprises a USB key, for example, portable memory device 100 would also comprise of an internal memory (not shown, see FIG. 3).

As mentioned above, CPU 204 is responsible for executing portable memory device 100's software, which comprises of a user interface (not shown). This user interface is discussed in greater detail below in relation to FIG. 4 and FIG. 5.

Figure 3:
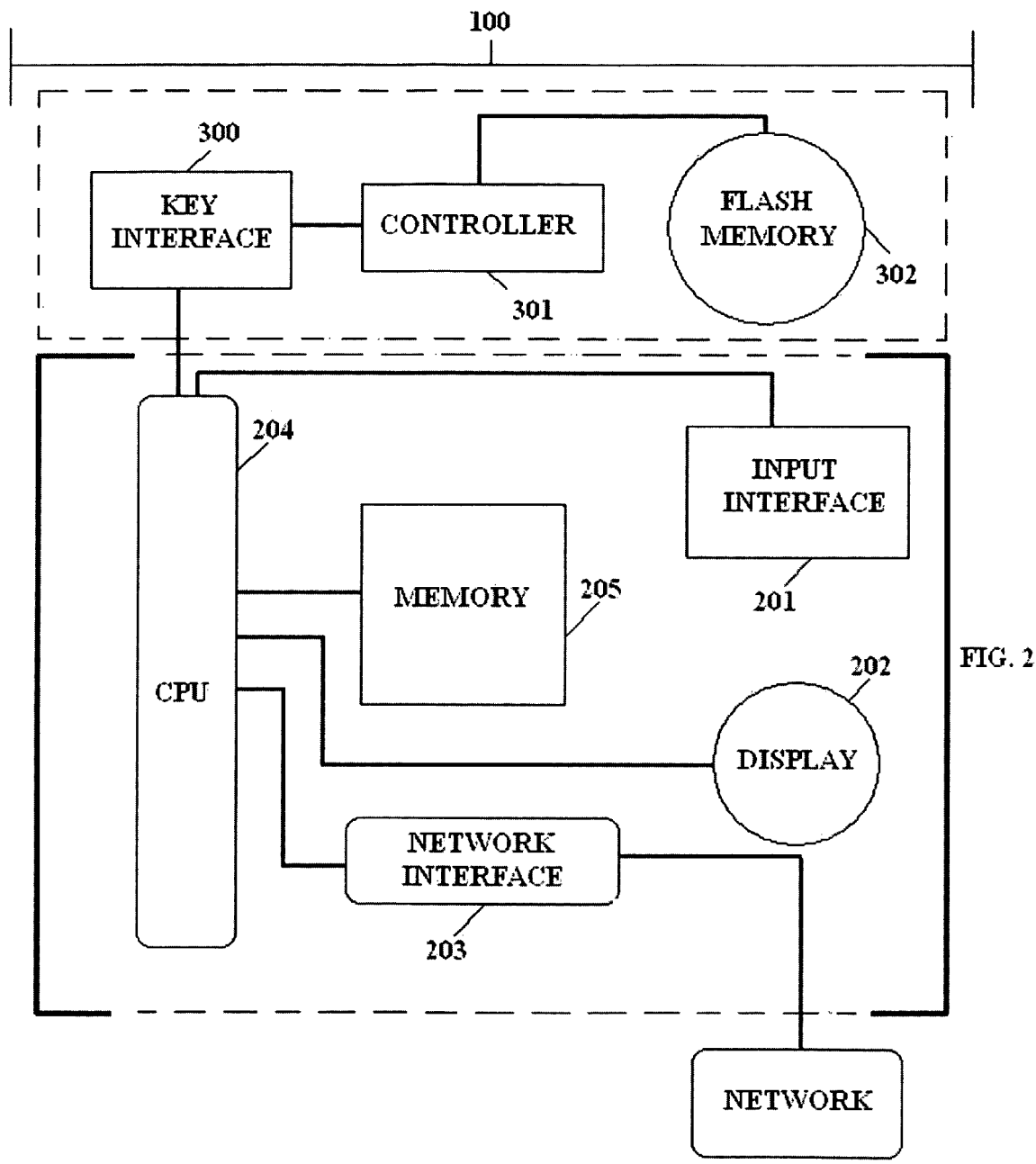
FIG. 3 illustrates a block diagram of the interior of portable memory device 100 in accordance with one embodiment of the present invention.

FIG. 3 illustrates a block diagram of the interior components of portable memory device 100 in accordance with an exemplary embodiment of the present invention.

The interior components of portable memory device 100 comprise of key interface 300, controller 301, and flash memory 302.

Typically, key interface 300 is a male-type-A USB connector that allows portable memory device 100 to connect to a computer that has access to a network where portable memory device 100 may locate additional memory. Controller 301 may be a small RISC microprocessor or similar type of controller. Additionally, Portable memory device 100 may utilize a small amount of ROM and RAM. Flash memory 302 may be any flash memory device known in the art that is suitable for portable memory devices such as a Hynix Semiconductor HY27USxx121M series NAND Flash memory device, featuring 4096 independent erasable blocks each providing 16 Kbytes of storage, yielding about 64 Mbytes of usable storage. Furthermore, flash memory may comprise of more than one Flash device for additional capacity.

Naturally, using another type of controller or another type of memory device would not depart from the scope of the present invention.

FIG. 4 illustrates a screenshot of a user interface for use with a portable memory device in accordance with the present invention, displaying both local and remote files as if they were on the same physical location. Although typically a user interface in accordance with the present invention may list files in a number of ways including the manner illustrated by FIG. 4, any other way of displaying the files and various data stored by a portable memory device does not depart from the scope of the present invention.

FIG. 4 shows user interface 400 displaying all the files stored. User interface 400 includes each file's name, each file's type, and date of file modification; however files may be displayed in any order or fashion known in the art without departing from the scope of the present invention. While all the files are listed in the same user interface 400, some files may be available and others may not. Local file 401 is always available because it is stored in a local physical memory storage space such as that of a portable memory device. Remote file 402 is listed, however, it may or may not be available to a user depending on whether or not a connection exists to the remote location in which file 402 is stored.

In one embodiment of the present invention, files such as file 402 which are not available (e.g. a network connection has not been established) may be visually marked in user interface 400 in some way as to notify the user of its accessibility restrictions. This may be desirable so that a user is aware of which files require a network connection to retrieve. This may be accomplished by placing a marker similar to private tag 403 (discussed below), highlighting available files, or executing a message window that notifies a user that a network connection is required to access some files.

Private tag 403 may be placed by a user on those files which are for private use only, here file 404 has been tagged by tag 403 to restrict accessibility. As discussed above (see FIG. 1), file 404 may be accessible only through use of a portable memory device which stored the files in either its physical memory or in a remote location.

In one embodiment, the information displayed in user interface 400 does not notify the user that a portable memory device has ran out of physical memory and automatically connects to a remote source for additional space. Not notifying the user may be desirable to give the illusion that the device only has one source of memory, thus creating an illusion that the device itself contains limitless memory space.

In an exemplary embodiment of the present invention, a user interface does not directly inform the user of the source of the additional memory storage space but rather displays a window with at least two partitions that notify the user of files that are stored locally and therefore always available, and files that are not stored locally which may require a network connection. Such an embodiment of a user interface in accordance to the present invention is discussed in turn.

Figure 5:
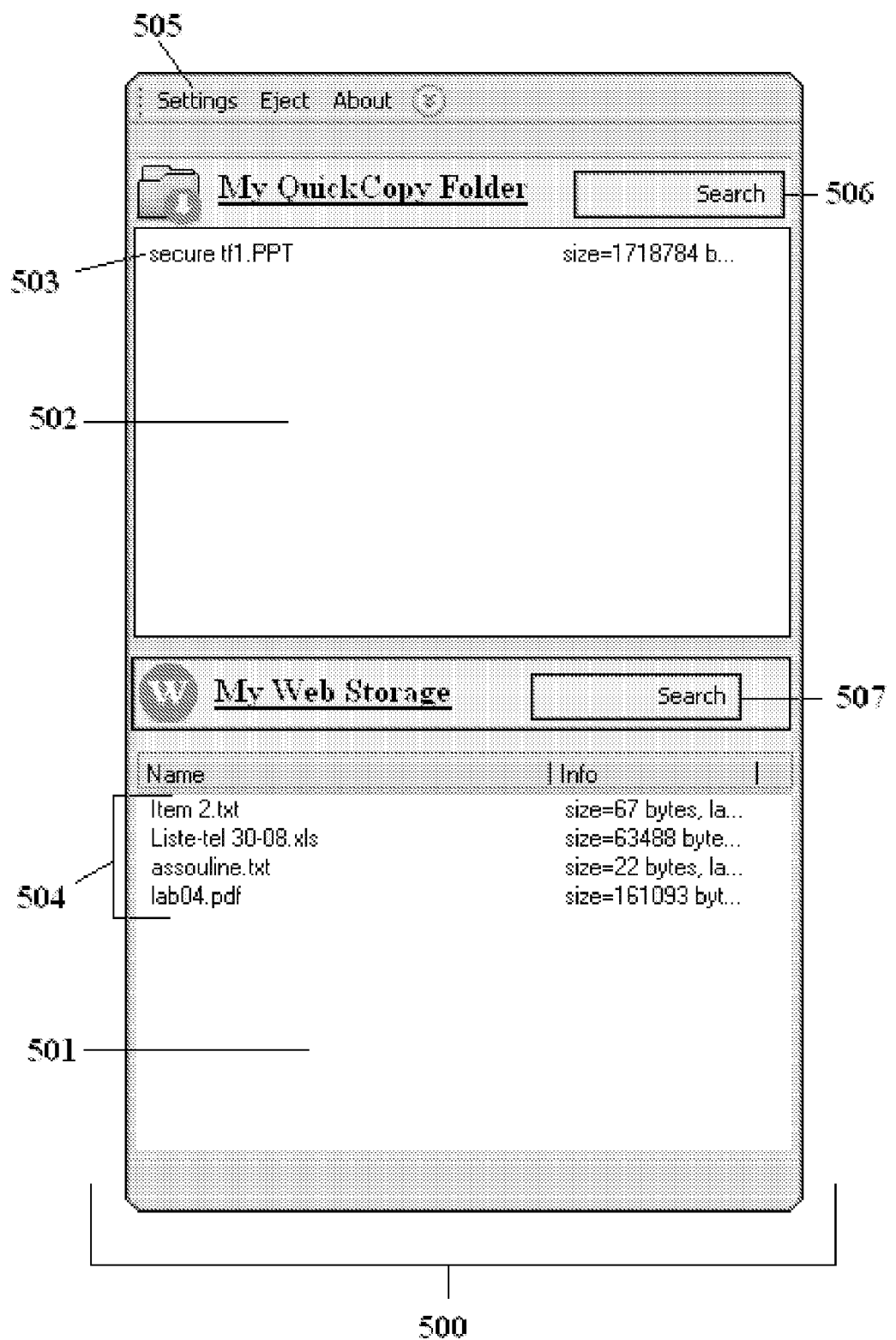
FIG. 5 illustrates a screen shot of a user interface for a portable memory device in accordance with an exemplary embodiment of the present invention.

FIG. 5 illustrates a screen shot of a user interface for a portable memory device in accordance to an exemplary embodiment of the present invention. User interface 500 comprises of two partitions 501 and 502.

Partition 502 is reserved for files stored locally, while partition 501 is reserved for files stored in a remote location, for example a server accessible via a network connection.

In one embodiment files from partition 501 may be moved to partition 502 and vice versa using a click and drag method common in the art. This allows a user to determine which files will be stored locally and which files will be stored remotely. When a user moves a file from one partition to the other the file may be stored right away if a connection to a remote location is presently established, or may visually allow one file to be moved from one partition to another and delay storing the file until a later time when a connection to a remote location is made available. If this is the case it may be desirable to notify a user that in order to complete the action or actions taken (to store the data in the correct location(s)) that a network connection will first need to be established.

For example, and without limiting the scope of the present invention, file 503 may be moved (i.e. using a click and drag method) from its present location, from partition 502 to partition 501, so that file 503 may be saved in a remote location along with remotely stored files 504, for example files remotely stored in a web-storage space. If a connection is not established to the remote location referenced by partition 501 (i.e. a web-storage space), file 503 may still be placed in partition 501 but will not be transferred and stored to the actual remote location until a connection is established. Alternatively, in another embodiment, files from partition 502 may not be transferred to partition 501, or vice versa, unless a connection to the remote location, where files 504 are located, is established. Thus, user interface 500 will not allow a user to click and drag a file from one partition to the other until such network connection is made available to portable memory device 100.

User interface 500 is shown with function tab 505. Function tab 505, labeled "Settings" is typically used for setting criteria for storing, saving, and distributing information stored in a portable memory device.

In one embodiment, the criteria selected by a user comprise of memory capacity.

In another embodiment, the criteria selected by a user comprise of file content.

In yet another embodiment, the criteria selected by a user comprise of file size.

In yet another embodiment, the criteria selected by a user comprise of and user selected files.

In yet another embodiment, the criteria selected by a user comprises of file credentials like belonging to a group.

In an exemplary embodiment, the criteria selected by a user comprise of a combination of several options left up to the user for implementation, including memory capacity, file content, file size, and user selected files.

Additionally, placing files on partition 501, or a remote location, may provide a user with a variety of options including sending files to a companies database. Furthermore, other options may be easily implemented which are not necessarily related to data storage.

In one embodiment, files place on partition 501 are sent to a remote location, wherein the remote location is an email address. For example, and without limiting the scope of the present invention, instead of saving a document onto portable memory device 100, a document is placed by a user into partition 501 and that document is sent to an email such as the users own email address.

In another embodiment, files placed in partition 501 may be sent to a fax machine.

In yet another embodiment, files placed in partition 501 may be sent to a remote location for printing. For example, and without limiting the scope of the present invention, portable memory device 100 is an SD card loaded with software and is inserted in a mobile phone equipped with a camera. The user could take a picture then, portable memory device 100, utilizing the phone's wireless network, could send each picture to a remote location where external software is in turn responsible for printing the images.

Search functions 506 and 507 provide a user with search capabilities in the event that many files are stored in portable memory device 100, making their retrieval easier.

Figure 6:
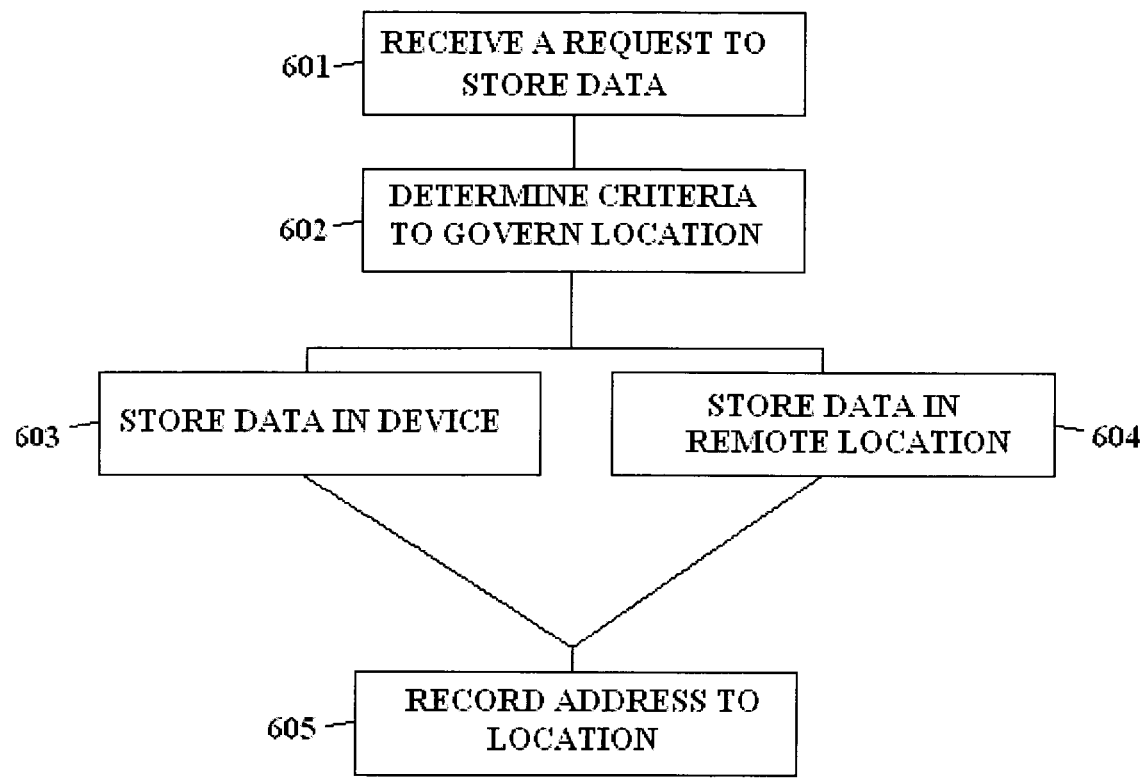
FIG. 6 illustrates a flow chart of a method for storing data using a portable memory device, in accordance with one embodiment of the present invention.

FIG. 6 illustrates a flow chart of a method for accessing remote memory storage space and storing data in a location governed by some criteria, in accordance with one embodiment of the present invention. The method is explained in the order shown below; however the following steps may be taken in any other conceivable sequence without deviating from the scope of the present invention.

Now turning to step 601, a request to store data is received by portable memory device 100. This may be an automatic request or in response to a user input via input interface 201.

Step 602 comprises of determining location where the requested data will be stored. Typically, software in portable memory device 100 will execute a function for predetermined criteria. Once a criterion is known to the software, the software executes the appropriate function to determine the appropriate location to store a data.

If the criteria in step 602 govern that the data can be stored in the device, then in step 603, the data is actually stored in portable memory device 100's physical memory.

If the criteria in step 602 governs that the data cannot be stored in the physical memory of portable memory device 100, then in step 604 portable memory device 100 stores the data in a remote location, for example an available web-storage location in a server.

In one embodiment a criteria comprises memory capacity. A user may choose to stop storing data in portable memory device 100 once a certain level of memory stored is reached.

In another embodiment a criteria comprises of file content. The content on a file may be used as criteria to govern the storing location of that file, for example, and in no way limiting the scope of the present invention, a user may choose to save all images on the web in order to leave the physical memory storage capacity available for other types of files such as word documents. These images may additionally be saved as ready for printing, or even be sent to print.

In yet another embodiment the criteria comprises file size. A user may choose to save only one or two very important large files on the physical memory of portable memory device 100, and save all other data contained in several small files on a remote location.

In yet another embodiment the criteria comprises user selected files. A list of types of files, file names or any other identification of files may be provided in the settings tab of function tab 505. Under settings function tab 505, a list may also be created by a user so that every time those types of files or files with a particular name, are stored by portable memory device 100, the device chooses the location to store those files in accordance with the location predetermined by each user.

In step 605, whether a local or remote location have been selected for storage of data requested, the address of the storage location is recorded for retrieval at a later time. In an exemplary embodiment, each file stored is tagged with a pointer that contains the address of the location where the data in the file is stored.

Figure 7:
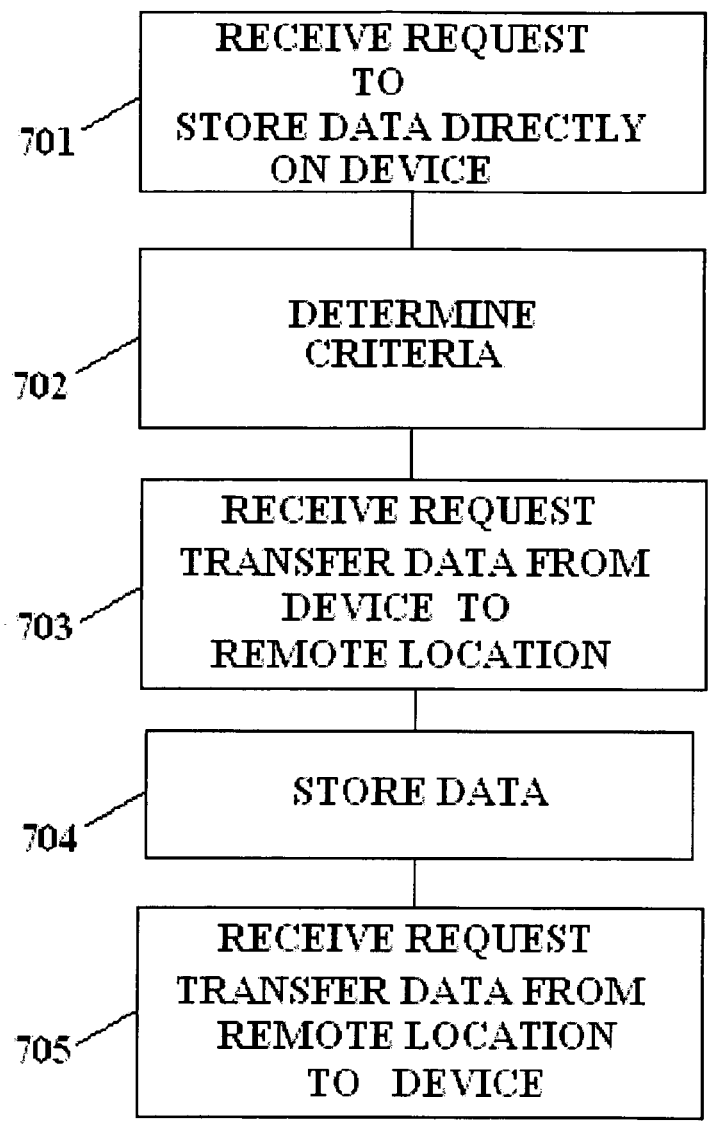
FIG. 7 illustrates a flow chart of a method for transferring the physical location of stored data utilizing a portable memory device, in accordance with one embodiment of the present invention.

FIG. 7 illustrates a flow chart of a method for transferring data stored in a remote location to a local physical memory, utilizing portable memory device 100, in accordance with one embodiment of the present invention. The method is explained in the order shown below; however the following steps may be taken in any other conceivable sequence without deviating from the scope of the present invention.

In step 701 a request is received to store data directly on portable memory device 100's physical memory.

In step 702 a determination is made whether or not the data requested to be stored may indeed be stored on to the device; this determination is made based on criteria such as memory space available, contents of a file, or any other type of criteria that may be used in determining whether the data may be stored locally.

In step 703, a request to transfer data from portable memory device 100 to a remote location is received. This may be useful if at the step 702 determination, it is determined that the data cannot be stored locally, for example because the local memory is full. Alternatively, this step may be taken simply to reorganize files stored, to add more local space, or to make files available to a public via a network (see FIG. 1). In step 704, a network connection is established, a server is reached with available memory, and the data is stored in an available remote location.

In step 705, a request is received to transfer data from a remote location on to a potable memory device 100; once it is determined that enough memory exists in portable memory device 100 (i.e. portable memory device 100's physical memory) the data is transferred to the physical memory storage of portable memory device 100.

Figure 8:
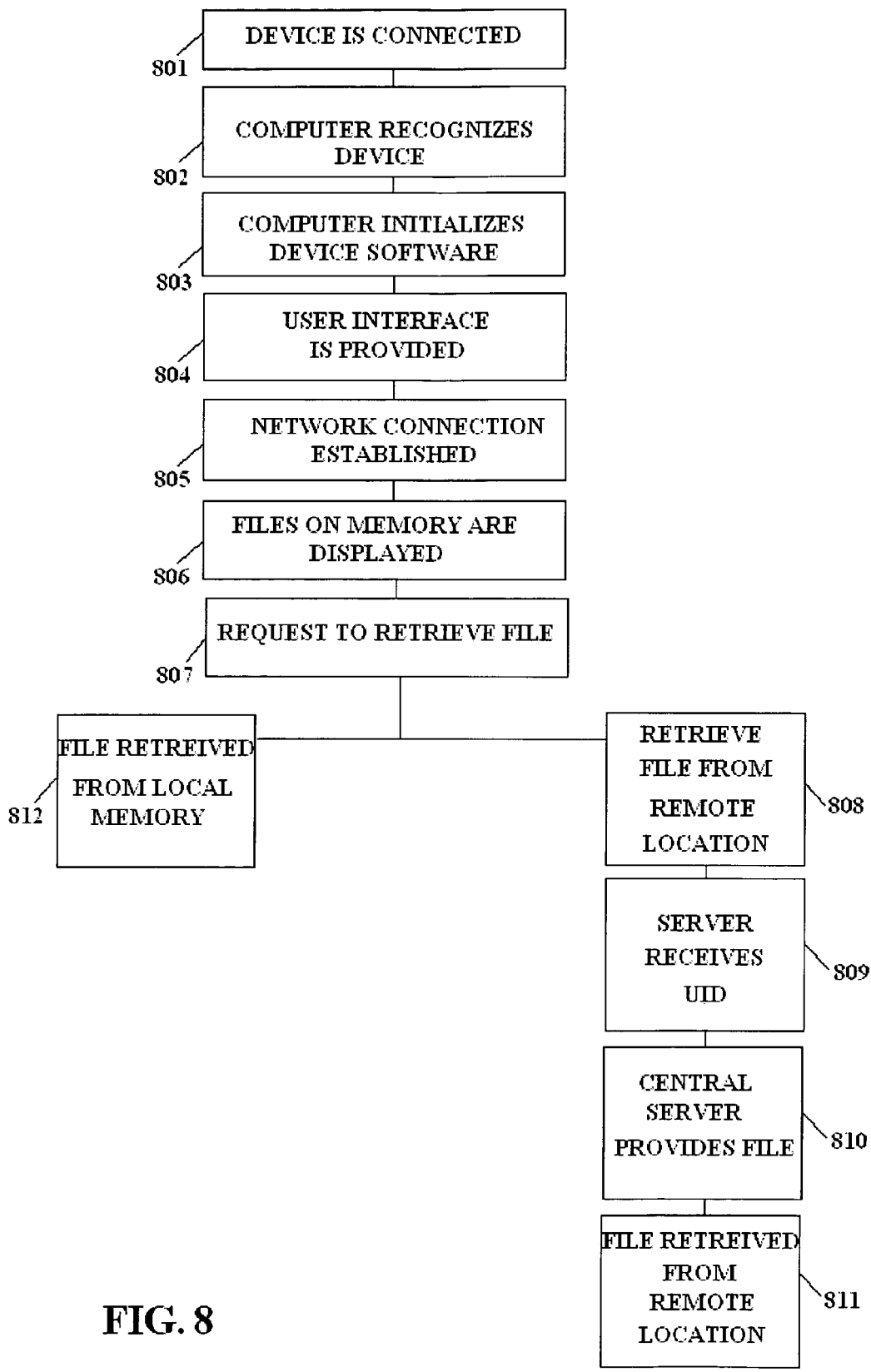
FIG. 8 illustrates a flow chart of a method for automatically launching a user interface and retrieving data stored on portable memory device 100, in accordance with one embodiment of the present invention.

FIG. 8 illustrates a flow chart of a method for automatically launching a user interface and retrieving data stored on portable memory device 100, in accordance with one embodiment of the present invention. The method is explained in the order shown below; however the following steps may be taken in any other conceivable sequence without deviating from the scope of the present invention.

In step 801 portable memory device 100 is engaged. This may require connecting portable memory device 100 to a computer, for example through a USB interface.

In several embodiments of the present invention however, this step may only require turning the device on because portable memory device 100 may actually be embedded with other components, such as a network interface, a display, and an input interface, that it would otherwise require.

For example, portable memory device 100 may be a mobile phone which naturally includes an input interface, a display, and a network connection—thus no need to plug in to another device such as a computer that would otherwise provide such components.

In step 802 portable memory device 100 is recognized by the controller of the device to which it is plugged in to. Again, if portable device 100 is actually an internal component of another device, such as a camera or mobile phone, then this step is essentially skipped since it can be presumed that a device comprising portable memory device 100 will inherently recognize its own components.

In step 803, portable memory device 100's software is initialized. This may be automatic or by user command, such as a function key that prompts a controller to read and execute the software in portable memory device 100.

In one embodiment, this software is initialized when a criteria is met, for example a memory capacity becomes full or is more than half full—prompting the software to engage in locating other sources of memory storage space in remote locations.

In step 804, a user interface is provided to display all the information stored by portable device 100, whether it is located in a local (portable device 100's physical memory) or remote location (such as a server accessible through a network).

In step 805, a connection is established to at least one remote location where data is stored. In one embodiment, software establishes a connection with a central server where a number of addresses are stored for accessing several other servers, each containing memory storage space that is available for new data, or that contains data associated with a user identifier, in turn associated with portable memory device 100.

In step 806, all files are displayed. In one embodiment, each file displayed contains a pointer associated with an address of a location (remote or local) where the file displayed may be accessed and retrieved. Typically, all the files are listed in one table to give the impression that all the files are actually located in a single location. However, every file may be located in one, two, or even several locations throughout a network of servers.

In another embodiment, all the files located in portable memory device 100's physical (or local) memory are listed in one window or partition, and all the remotely stored files are located in another window or partition of a window.

Finally, in step 807, a request is received from a user to retrieve a displayed file. In one embodiment, a user double-clicks on the desired file which is tagged with a pointer containing the address of the location in which that file is stored, whether locally or remotely.

If the file is located in a remote location, in step 808, a request is sent by portable memory device 100 to a central server (i.e. central server 106) to retrieve the requested file.

In step 809, the server recognizes portable memory device 100's unique identifier and accesses the remote server in which the requested file is actually located to retrieve the file.

In step 810, the requested file is provided by the central server to portable memory device 100.

In step 811, the file is retrieved and displayed for the user.

Alternatively, if the file requested is locally located, in step 812, portable memory device 100 retrieves the file from its physical memory and displays it for the user.

A system and method for a portable memory device to access and acquire additional memory from a remote location has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching. It is intended that the scope of the invention not be limited by this detailed description, but by the claims and the equivalents to the claims.

What is claimed is:

1. A method of storing data comprising:
   detecting, by a computing device, a portable memory device that is separate and apart from said computing device and which attaches to said computing device by way of a USB interface;
   reading, by the computing device, a software algorithm stored in the portable memory device by way of the USB interface;
   executing, by the computing device, the software algorithm, wherein the execution of the software algorithm produces a user interface;
   receiving, by the computing device, a request to store said data by way of the user interface;
   determining, by the computing device, in accordance with the software algorithm, whether to store said data in the portable memory device or in a remote storage device based on a criteria; and
   storing, by the computing device, the data in the portable memory device by way of the USB interface based on the criteria; or
   sending, by the computing device, the data to the remote storage device for storage therein by way of a network interface based on the criteria.

2. The method of claim 1, wherein said criteria relates to a user input indicating whether to store said data to said portable memory device or to store said data to said remote storage device.

3. The method of claim 2, wherein a user can shift said data between said portable memory device and said remote storage device based on said user input.

4. The method of claim 2, wherein at least one pointer is used to identify an address of said data within said remote storage device.

5. The method of claim 4, wherein said at least one pointer is located remotely within said remote storage device.

6. The method of claim 4, wherein a unique identifier is assigned to said portable memory device, and wherein the unique identifier is configured to be recognized by the remote storage device for accessing said data.

7. The method of claim 6, wherein said at least one pointer comprises an indicator related to said unique identifier.

8. The method of claim 1, wherein said portable memory device determines a format of said data and said criteria is based on said format of said data.

9. The method of claim 1, wherein said portable memory device determines a size of said data and said criteria is based on said size of said data.

10. The method of claim 9, wherein said criteria specifies that said data is to be stored in said remote storage device if said size of said data exceeds a predetermined size.

11. The method of claim 1, wherein said user interface is configured to receive a security level associated with said data, and said criteria is based on said security level.

12. The method of claim 11, wherein said security level allows private access to a private data section of said data by said user only.

13. The method of claim 12, wherein said security level allows public access to a public data section of said data.

14. The method of claim 13, wherein said security level allowing public access to said public data section also allows said public data section to be available over a web address.

15. The method of claim 1, wherein said portable memory device determines an ownership of said data, and said criteria is based on who is authorized to access said data.

16. A method to store first data on a portable memory device comprising:
    detecting, by a computing device, the portable memory device that is separate and apart from said computing device and which attaches to said computing device by way of a USB interface;
    reading, by the computing device, a software algorithm stored in the portable memory device by way of the USB interface;
    executing, by the computing device, the software algorithm, wherein the execution of the software algorithm produces a user interface;
    receiving, by the computing device, a request to store said first data onto said portable memory device by way of the user interface,
    determining, by the computing device, in accordance with the software algorithm, whether said first data can be stored onto said portable memory device based on a criteria,
    transferring, by the computing device, second data within said portable memory device to a remote storage device based on said criteria, and
    storing, by the computing device, said first data to said portable memory device.

17. The method of claim 16, wherein a user can shift said second data between said portable memory device and said remote storage device based on a user input.

18. The method of claim 16, wherein at least one pointer is used to identify an address of said second data within said remote storage device.

19. The method of claim 18, wherein at least one pointer is located remotely within said remote storage device.

20. The method of claim 18, wherein a unique identifier is assigned to said portable memory device, and wherein the unique identifier is configured to be recognized by the remote storage device for accessing said data.

21. The method of claim 20, wherein said at least one pointer comprises an indicator related to said unique identifier.

22. The method of claim 16, wherein said user interface is configured to receive a security level associated with said data and said criteria is based on said security level.

23. The method of claim 22, wherein said security level allows private access to a private data section of said data by said user only.

24. The method of claim 23, wherein said security level allows public access to a public data section of said data.

25. The method of claim 24, wherein said security level allowing public access to said public data section also allows said public data section to be available over a web address.

26. A method to retrieve a data comprising:
    detecting, by a computing device, a portable memory device that is separate and apart from said computing device and which attaches to said computing device by way of a USB interface;
    in response to the detection, reading, by the computing device, a software algorithm stored in the portable memory device by way of a USB interface;
    executing, by the computing device, the software algorithm, wherein the execution of the software algorithm produces a user interface;
    receiving, by the computing device, a request to retrieve data by way of the user interface;
    determining, by the computing device, in accordance with the software algorithm, whether to retrieve the data from the portable memory device or from a remote storage device based on a criteria; and
    retrieving, by the computing device, the data from the remote storage device by way of a network interface based on the criteria; or
    retrieving, by the computing device, the data from the portable memory device by way of a network interface based on the criteria.

27. The method of claim 26, wherein at least one pointer that is located on the remote storage device is used to identify an address of said data with the remote storage device.

28. The method of claim 26, wherein a unique identifier is assigned to said portable memory device, and wherein the unique identifier is configured to be recognized by the remote storage device for accessing said data.

29. The method of claim 28, wherein said at least one pointer comprises an indicator related to said unique identifier.

30. A portable memory device for storing data comprising:
    a local storage to store said data,
    a USB interface for connection to a computer, wherein said computer is separate and apart from said portable memory device;
    a controller configured to:
        transfer a software algorithm stored in the local storage to the computer by way of the USB interface, wherein said software algorithm is configured to generate a user interface when executed by the computer;
        process a request received via the user interface from the computer and by way of the USB interface to store said data onto said local storage,
    determining, a criteria for controlling a location of said data, wherein said criteria is based on a data storage capacity of the portable memory device;

storing said data to said local storage, wherein said data is received by way of the USB interface if it is determined that said data should be stored to said local storage based on said criteria, and sending instruction to the computer by way of the USB interface to store said data to a remote storage device by way of a network interface if it is determined that said data should be stored to said remote storage device based on said criteria.

31. The portable memory device of claim 30, wherein said criteria is based on a user input indicating whether to store said data to said portable memory device or store said data to said remote storage device.

32. The portable memory device of claim 31, wherein said user can shift said data between said portable memory device and said remote storage device based on said user input.

33. The portable memory device of claim 31, wherein at least one pointer is used to identify an address of said data within said remote storage device.

34. The portable memory device of claim 33, wherein said at least one pointer is located remotely within said remote storage device.

35. The portable memory device of claim 33, wherein a unique identifier is assigned to said portable memory device, and wherein the unique identifier is configured to be recognized by the remote storage device for accessing said data.

36. The portable memory device of claim 35, wherein said at least one pointer comprises an indicator related to said unique identifier.

37. The portable memory device of claim 36, wherein said controller further comprises of a microprocessor.

38. The portable memory device of claim 30, wherein said portable memory device determines a format of said data and said criteria is based on said format of said data.

39. The portable memory device of claim 30, wherein said portable memory device determines a size of said data and said criteria is based on said size of said data.

40. The portable memory device of claim 39, wherein said criteria specifies that said data is to be stored in said remote storage device if said size of said data exceeds a predetermined size.

41. The portable memory device of claim 30, wherein said user interface is configured to receive a security level associated with said data and said criteria is based on said security level.

42. The portable memory device of claim 41, wherein said security level allows private access to a private data section of said data by said user only.

43. The portable memory device of claim 42, wherein said security level allows public access to a public data section of said data.

44. The portable memory device of claim 43, wherein said security level allowing public access to said public data section also allows said public data section to be available over a web address.

* * * * *